United States Patent
Froim et al.

(10) Patent No.: US 11,983,924 B2
(45) Date of Patent: May 14, 2024

(54) AUTOMATED TOLERANCE-BASED MATCHING OF VIDEO STREAMING EVENTS WITH REPLAYS IN A VIDEO

(71) Applicant: W.S.C. SPORTS TECHNOLOGIES LTD., Givatayim (IL)

(72) Inventors: Sahar Froim, Givatayim (IL); Nitzan Cohen, Herzliya (IL); Ido Loebl, Tel-Aviv (IL)

(73) Assignee: W.S.C. SPORTS TECHNOLOGIES LTD., Givatayim (IL)

( * ) Notice: Subject to any disclaimer, the term of this patent is extended or adjusted under 35 U.S.C. 154(b) by 0 days.

(21) Appl. No.: 18/507,131

(22) Filed: Nov. 13, 2023

(65) Prior Publication Data

US 2024/0078806 A1    Mar. 7, 2024

Related U.S. Application Data

(63) Continuation of application No. PCT/IL2022/050491, filed on May 11, 2022.
(Continued)

(51) Int. Cl.
*G06V 20/40*    (2022.01)
*H04N 21/234*    (2011.01)

(52) U.S. Cl.
CPC ............ *G06V 20/44* (2022.01); *G06V 20/46* (2022.01); *G06V 20/48* (2022.01); *G06V 2201/10* (2022.01); *H04N 21/23418* (2013.01)

(58) Field of Classification Search
CPC ........ G06V 20/44; G06V 20/46; G06V 20/48; G06V 2201/10; H04N 21/23418
See application file for complete search history.

(56) References Cited

U.S. PATENT DOCUMENTS

| | | | |
|---|---|---|---|
| 6,931,595 B2 * | 8/2005 | Pan | G06F 16/786 |
| | | | 725/38 |
| 2003/0076448 A1 * | 4/2003 | Pan | H04N 21/2387 |
| | | | 348/E7.071 |

(Continued)

OTHER PUBLICATIONS

Tong et al. "Shot Classification in Sports Video", IEEE 2004, Retrieved on Sep. 19, 2022, Retrieved from the Internet: https://www.researchgate.net/publication/4149006_Shot_classification_in_sports_video.

(Continued)

*Primary Examiner* — Amara Abdi
(74) *Attorney, Agent, or Firm* — PEARL COHEN ZEDEK LATZER BARATZ LLP

(57) ABSTRACT

Systems and methods of associating a replay with an event in an input video comprise: identifying, by a processor, an event captured in the input video and at least one replay included in the input video; assigning, by the processor, a first probability value to the event indicating a probability that at least one replay of the event is included in the input video; assigning, by the processor, a second probability value to each of a plurality of replay segments of the input video indicating a probability that the respective replay segment is related to the event; for each of the plurality of replay segments, calculating, by the processor, a matching value based on the first and second probability values; and associating, by the processor, the event with each of the plurality of replay segments for which the matching value is within a predefined threshold range.

10 Claims, 5 Drawing Sheets

Related U.S. Application Data

(60) Provisional application No. 63/187,521, filed on May 12, 2021.

(56) References Cited

U.S. PATENT DOCUMENTS

| | | |
|---|---|---|
| 2006/0083304 A1 | 4/2006 | Pan et al. |
| 2008/0138029 A1 | 6/2008 | Xu et al. |
| 2015/0363648 A1* | 12/2015 | Li ............................ G06F 18/23 386/241 |
| 2016/0286244 A1* | 9/2016 | Chang ................ H04N 21/4788 |
| 2020/0053401 A1* | 2/2020 | Obara .................. G11B 27/005 |
| 2020/0304841 A1* | 9/2020 | Chang ................ H04N 21/8549 |
| 2020/0348642 A1 | 11/2020 | Nagarajan |
| 2023/0055636 A1* | 2/2023 | Cheng .................... G06N 3/045 |

OTHER PUBLICATIONS

International Search Report and Written Opinion for PCT Application No. PCT/IL2022/050491, dated Oct. 27, 2022.

\* cited by examiner

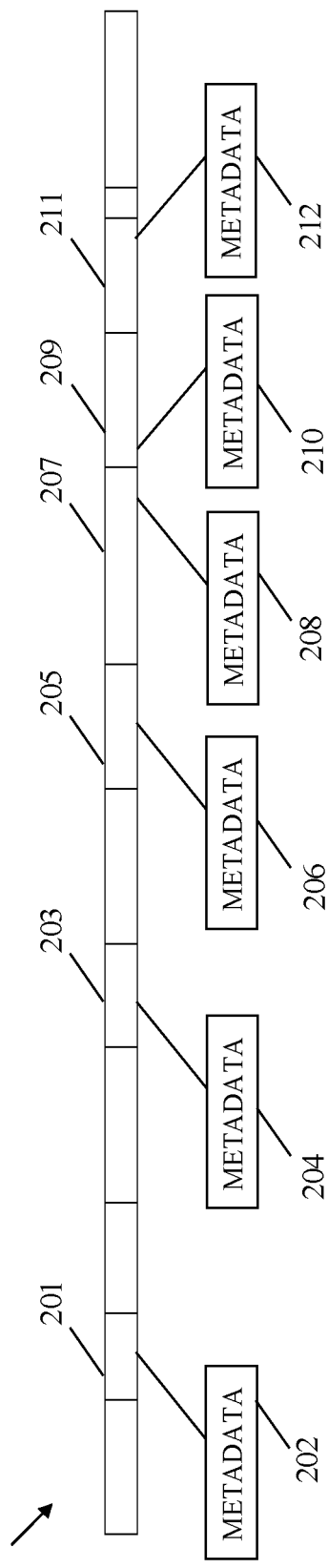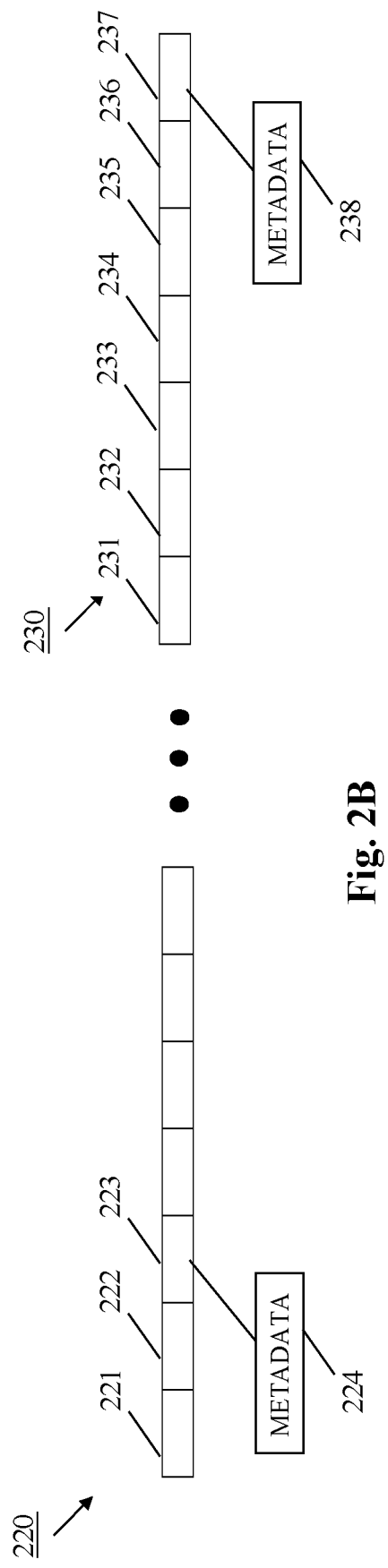
Fig. 2A
Fig. 2B

AUTOMATED TOLERANCE-BASED MATCHING OF VIDEO STREAMING EVENTS WITH REPLAYS IN A VIDEO

CROSS REFERENCE TO RELATED APPLICATIONS

This Application is a continuation of PCT Application No. PCT/IL2022/050491 filed on May 11, 2022, claiming priority from U.S. Provisional Patent Application No. 63/187,521 filed on May 12, 2021, both of which are incorporated herein by reference in their entirety.

FIELD OF THE INVENTION

Embodiments of the present invention relate generally to processing of video and multimedia content. More specifically, embodiments of the present invention relate to associating events captured in a video with replays of the events.

BACKGROUND OF THE INVENTION

Replays of events captured in video are known, e.g., professional sports broadcasters add replays of (previous) high interest events in a game to a live video broadcast. A replay of an event can show the event from an additional, different angle or point of view and/or at a different speed than the original event in the video (e.g., slow-motion).

Associating a replay with the relevant event is valuable in the industry since it enables generating high quality content, e.g., generate a video clip that includes an event and its replay, enabling to jump or skip from/to an event in a video to/from the replay of the event, selecting a replay to be inserted into a live broadcast and so on. However, in practice, associating a replay with the relevant event is difficult for computers to perform automatically because different angles, speeds and camera occlusions often obscure or confuse automated analysis of the videos.

Accordingly, there is a long-felt need in the art for a system and method that can automatically associate an event captured in a video with one or more video captured replays of the event.

SUMMARY OF THE INVENTION

Embodiments of the invention solve the aforementioned long felt need in the art by providing an automated tolerance-based system and method for matching video streaming events with replays in a video. Due to the great number of variables in video recording, e.g., angles, speeds, resolutions, camera occlusions, etc. automated event analysis that requires exact rules-based matching often fails. Accordingly, embodiments of the invention provide a "fuzzy," tolerance-based, or inexact matching algorithm that allows threshold variations to match to account for the variability in video recording.

In some embodiments, a system and method of associating a replay with an event may include a process or processor for identifying an event captured in the input video content and at least one replay included in the input video; calculating a first probability value, the first value indicating a likelihood or probability that at least one replay of the event is included in the video content; calculating a second probability value, the second value indicating a likelihood or probability that a specific replay included in the video content is related to the event; calculating a matching value based on the first and second values; and if the matching value is within a predefined range (e.g., at, above, or below a threshold), then associating the event with the specific replay.

An embodiment may calculate, with respect to a specific replay, a matching value for each of a plurality of events; and the embodiment may associate the specific replay with the event having the highest matching value. An embodiment may calculate, with respect to a specific event, a matching value for each of a plurality of replays; and the embodiment may associate the specific event with the replay having the highest matching value.

In some embodiments, a matching function used for calculating a matching value may be based on a time interval between an event and a replay. A matching function used for calculating a matching value may be based on the number of events between a replay and an event. A matching function used for calculating a matching value may be based on the number of replays between a replay and an event. Associating an event with a specific replay may be based on metadata of at least one of: the event and the specific replay.

An embodiment may generate, for a set of events captured in a video, a respective set of event feature vectors in an embedding space; generate a set of replay feature vectors in the embedding space for a respective set of replays; and associate at least one of the replays with an event based on the distances of the relevant event feature vector from at least some of the replay feature vectors. The embedding space may be automatically and autonomously defined by a neural network.

A method of associating first and second images may include: obtaining a set of images, the set including the first and second images; generating, for each of the set of images, a feature vector in an embedding space; calculating a first distance, the first distance indicating the distance, in the embedding space, between the feature vector of the first image and the feature vector of the second image; calculating a set of distances, the set of distances indicating the distances, in the embedding space, between the feature vector of the first image and the feature vectors of the set of images; and if the first distance is smaller than each of the set of distances, then associating the first image with the second image.

A method of associating first and second sequences of frames may include: generating, for each of at least some of the frames, a feature vector in an embedding space; for each of at least some of the frames in the first sequence: calculating a set of distances between a feature vector of the frame and a respective set of feature vectors of frames in the second sequence; and associating the frame with a frame in the second sequence based on the shortest distance in the set of distances.

If an ordered set of frames in the first sequence is associated with a respective ordered set of frames in the second sequence then an embodiment may associate the first sequence with the second sequence. An ordered sequence of events may be associated with an ordered set of replays. An event captured from a first point of view may be associated with a replay of the event captured from a second, different point of view. An image or frame in the first sequence of frames or images in a video may be associated with a set of frames or images in a second sequence in the video.

An association of an event with a replay may be used to jump or skip from an event to a replay. An association of an event with a replay may be used to create a synopsis or highlights video. An event in the first video clip may be associated with a replay in another, second, different video clip. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with the same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

FIG. 2A schematically illustrates a video content data structure according to illustrative embodiments of the present invention;

FIG. 2B schematically illustrates segments and frames in a video according to illustrative embodiments of the present invention;

DETAILED DESCRIPTION OF THE INVENTION

Figure 1:
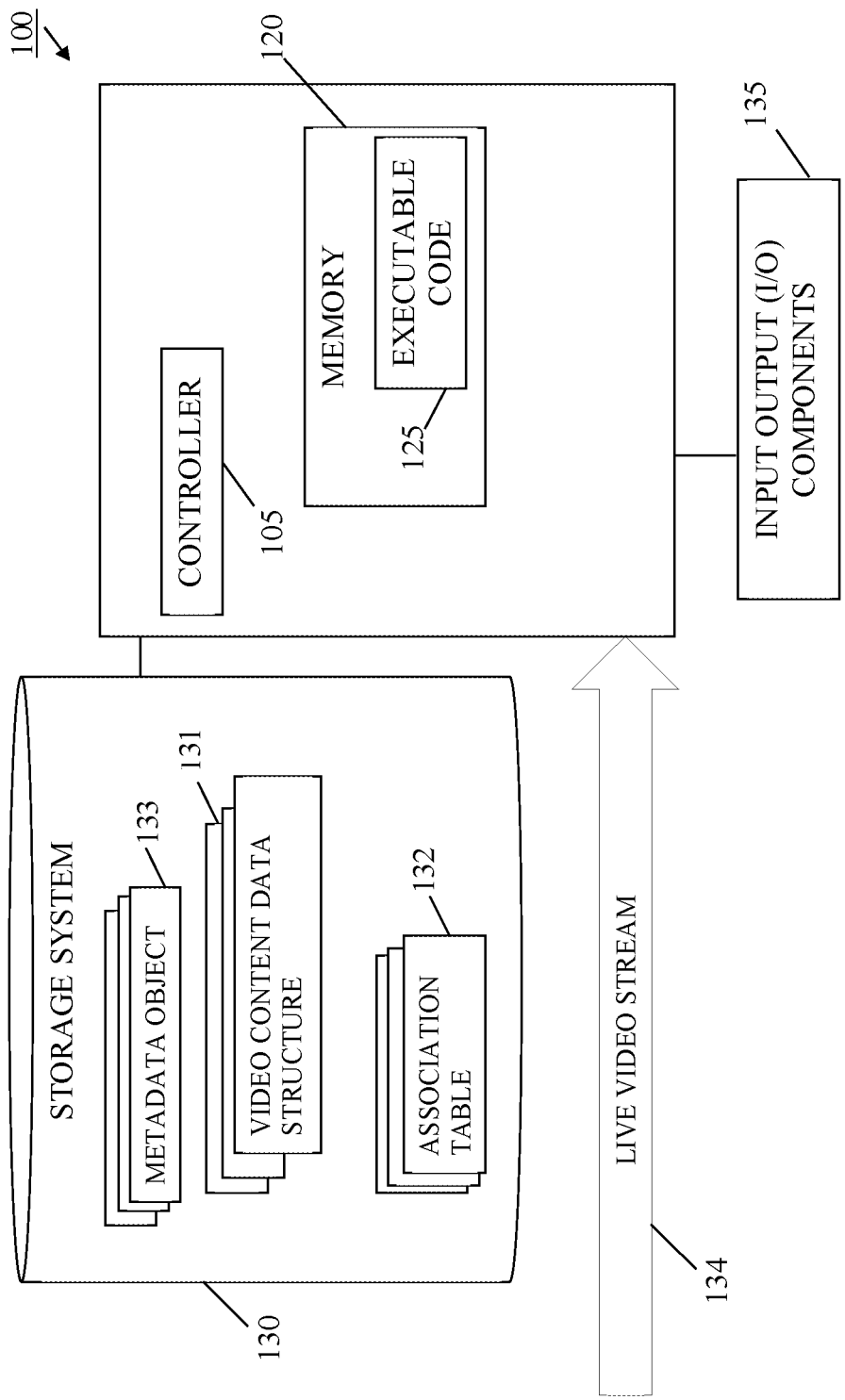
FIG. 1 shows a block diagram of a computing system according to illustrative embodiments of the present invention.

In some embodiments, a computing device or system may associate events with replays. Reference is made to FIG. 1, showing a non-limiting, block diagram of a computing device or system 100 that may be used to associate a replay with an event in an input video content according to some embodiments of the present invention. Computing device 100 may include a controller 105 that may be a hardware controller. For example, computer hardware processor or hardware controller 105 may include a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured or adapted (e.g., by executing software included in executable code 125) to carry out methods described herein. More than one computing device 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory, a cache memory, a buffer, a short term memory unit, a long term memory unit, or any other suitable memory units or storage units. Memory 120 may be or may include a plurality of possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

As referred to herein, "a controller" or "a processor" carrying out a function or set of functions can include one or more such controllers or processors, possibly in different computers, doing so. Accordingly, it will be understood that any function or operation described as performed by a processor or controller such as, e.g., controller 105 may be carried by a set of two or more processors or controllers in possibly respectively two or more computing devices. For example, in an embodiment, when the instructions stored in one or more memories 125 are executed by one or more controllers 105 they may cause the one or more controllers 105 to carry out methods of associating replays with events in an input video content as described herein. More than one computing device 100 may be included, and one or more computing devices 100 may act as the various components of a system according to some embodiments of the invention.

Executable code 125 may be an application, a program, a process, task or script. A program, application or software as referred to herein may be any type of instructions, e.g., firmware, middleware, microcode, hardware description language, etc., that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that associates replays with events in an input video content as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, in some embodiments, a first unit that includes a controller 105, a memory 120 and an executable code 125 may analyze an input video and identify connections or relations between segments of the video that include events and segments that include replays of the events, a second unit that includes a (same or another) controller 105, a memory 120 and an executable code 125 may update metadata of segments, a third unit may update an association table and so on.

Computing device or system 100 may include an operating system (OS) that may be code (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs to communicate. Operating system 115 may be a commercial operating system. Accordingly, units included in computing device or system 100 may cooperate, work together, share information and/or otherwise communicate.

Storage system 130 may be or may include, for example, a hard disk drive, a universal serial bus (USB) device or any other suitable removable and/or fixed storage unit. As shown, storage system 130 may include video content data structures 131, association tables 132 and metadata objects 133 (collectively referred to hereinafter as video content data structures 131, association tables 132 and metadata objects 133 or individually as video content data structure 131, association table 132 and metadata object 133, merely for simplicity purposes). For the sake of simplicity and clarity, video content data structures 131 may be referred to herein as video (or videos) 131.

Video content data structures 131, association tables 132 and metadata objects 133 may be any suitable digital data structure or construct or computer data objects that enables storing, retrieving and modifying values. For example, video content data structures 131, association tables 132 and metadata objects 133 may be files, objects, tables or lists in a file system or in a database in storage system 130. For example, association tables 132 and metadata objects 133 and may include fields or entries that can be set or cleared, a plurality of parameters for which values can be set, a plurality of entries that may be modified and so on. For example, an association table 132 may be updated by an embodiment when the embodiment determines that an event captured in a first video segment is replayed in another, second video segment.

Content may be loaded from storage system 130 into memory 120 where it may be processed by controller 105. For example, based on information in association tables 132 and metadata objects 133 controller 105 may generate video segments, e.g., generate a video segment including an event and all its replays.

In some embodiments, some of the components shown in FIG. 1 may be omitted. For example, memory 120 may be a non-volatile memory having the storage capacity of storage system 130. Accordingly, although shown as a separate component, storage system 130 may be embedded or included in system 100, e.g., in memory 120.

In some embodiments, I/O components 135 may be, may be used for connecting (e.g., via included ports) and/or they may include: a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (MC), a universal serial bus (USB) device or an external hard drive may be included in I/O components 135.

A system according to some embodiments of the invention may include components such as, but not limited to, a plurality of central processing units (CPU), Tensor Processing Units (TPU), graphics processing units (GPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

A video content data structure or object (or simply "video") may include any digital multimedia content object or stream that includes digital representations of visual and/or audio information, captions and/or metadata. For example, a video may include a digital object or stream of digital information usable for presenting a video clip by a computing device.

Reference is made to FIG. 2A, which schematically illustrates a video content data structure or object according to some embodiments of the present invention. As shown, a plurality of segments 201, 203, 205, 207, 209, and 211 may be identified in a video 200, e.g., segments may be identified by controller 105 in one of video content data structures 131. Reference is additionally made to FIG. 2B which schematically illustrates segments 220 and 230 respectively, including frames 221-223 and 231-237 according to some embodiments of the present invention.

Generally, video 200 includes a (typically large) number of frames. Reference is additionally made to FIG. 2B which schematically illustrates video segments 220 and 230 respectively including frames 221-223 and 231-237 according to some embodiments of the present invention.

A segment may include, or may be defined by, a start and an end time, e.g., with respect to the time of the first frame of video 200. Additionally or alternatively, a segment may be defined by references to the first and last frames of the segment, e.g., indices, sequence numbers or other values indicating the number of frames between the first frame of video 200 and the first/last frames of a segment may be used in order to define, identify and locate segment 203 in video 200. For example, segment 230 may be, may include or may be defined by the sequence numbers, relative location or time of frames 231 and 237 such that, provided with a video that includes segment 230, a system can readily find segment 230 in the video, extract segment 230 from the video, present segment 230 and so on.

As further shown, metadata objects 202, 204, 206, 208, 210, and 212 (e.g., metadata objects 133) may be created for, and associated with, segments 201, 203, 205, 207, 209, and 211. As further shown by metadata objects 224 and 238 (e.g., metadata objects 133) in FIG. 2B, metadata objects may be created for, and associated with, frames, e.g., metadata object 224 may include information related to frame 223 and metadata object 238 may include any description, analysis results or other information related to frame 237. As shown by metadata object 240, a metadata object for a segment may be created and stored (e.g., as one of metadata objects 133).

Some embodiments may automatically detect events in professional or other sports broadcast streams, video games, e-sports or any other form of multimedia content or videos. Generally, events represent occurrences that happen in reality and are captured in a video. For example, a point scored or a "touchdown" in a football game may be an event. Conversely, the absence of an occurrence may be an event, e.g., no score on fourth down. A replay may be a segment in which an event is shown, possibly in a different speed (e.g., in slow motion) and/or from a different point of view. For example, an event in a video 131 may be shown as captured by a first camera (e.g., placed in a first location) in a stadium and a replay in the video 131 may be the same event as captured by a second camera, e.g., placed in a second, different location in the stadium. A replay may include a part in which a still (frozen) image is shown (or the video is frozen or paused) possibly accompanied by captions or other graphical elements.

In various embodiments, one or more systems and/or methods for detecting or identifying events and/or replays in a video may be used by embodiments of the invention. For example, events and/or replays may be identified based on determining a goal was scored, sound of a crowd, information on a scoreboard, and/or any other information obtained by processing video and/or audio which captures a sporting event, an incident, occasion and the like. Replays may be identified by identifying slow-motion or fast-motion in a video and so on. In some embodiments, artificial intelligence (e.g., in the form of a model generated by training a neural network or other machine learning algorithm) may be used in order to identify events and/or replays in a video. Identifying events and/or replays may include marking them, e.g., by indicating the start and end frames of a segment that captures an event or a replay. For example, based on analysis of a video 131, an embodiment may record that frames 221, 222 and 223 capture an event and that frames 233-236 capture a replay. Accordingly, provided with an input video 131, an embodiment, e.g., controller 105 may readily access, process or otherwise use events and replays captured in the input video, e.g., controller 105 may know, detect, or recognize where, in the input video, events and replays start and end.

Accurately identifying events and replays automatically in a video is a challenge. Associating events with the correct replays, e.g., by finding a replay corresponding to a specific event is a challenge not yet met by conventional systems and methods. This challenge is difficult because replays typically show an event from a different angle or point of view than that of the event in the original video or broadcast. In addition, a replay can appear, in a video or broadcast, at any time after an event, possibly after other/subsequent events occurred or even after a number of other replays have been shown in the video. Accordingly, associating a replay segment (e.g., a segment including a replay) of a video 131 with an event segment (e.g., a segment showing the event) in the video is a complicated task. Yet another complication is the fact that a replay may capture an event in slow-motion, fast-motion or event mixed presentation speeds or paces. Moreover, a video 131 may include, for a single event, a number of replays. Furthermore, due to the fact that a set of events in the same video broadcast may be visually similar (e.g., two different events in which the same player dunks, or scores in a long shot). Therefore, in practice, current known computer systems and methods cannot accurately or reliably associate events with their replays.

Some embodiments of the invention automatically and accurately associate events with replays using a tolerance-based inexact matching algorithm that allows threshold variations to match to account for the variability in video recording. By associating (and recording associations of) events and replays, embodiments of the invention enable, for example, efficiently and easily playing all video segments related to an event (e.g., playing or creating a montage of all touchdowns, fouls, etc.), generating a synopsis or highlights video, skipping or jumping from an event to its replay, and so on. For example, using an association table 132 which may record the locations (e.g., in the form of a frame number or relative time in a video) of an event and its replay, an embodiment may, e.g., in response to a click or other input from a user, skip or fast-forward from an event to its replay, generate a short video that includes events and their replays and so on.

As described, although each part, stage or step in a set or sequence of processes (also referred to herein as a cascade process) may and can act on its own to associate a replay to its event, using a cascade process, series or a succession of stages may yield superior results. Generally, a step or stage may calculate, determine, estimate and/or quantify the likelihood of an event to have a replay, e.g., in the form of a probability value ranging from "0" to "1" where "0" means the event is unlikely to have a replay and "1" means there is surely at least one replay for the event. As used herein, the terms "likelihood" and "probability" may mean generally the same thing and may be used interchangeably.

A subsequent step may, e.g., using metadata of segments or frames (e.g., using information in metadata objects 221 and 231) calculate, determine, estimate and/or quantify the likelihood that a specific replay is for, of, or to be associated with, a specific event. For example, controller 105 may produce a likelihood, in the form of a probability value ranging from "0" to "1" where "0" means the specific event is unrelated to the specific replay and "1" means the specific replay is indeed a replay of the specific event. Specifically, the likelihood of a replay being of a specific event may be determined using a model generated using machine learning.

Generally, a model may be generated or trained using training data (or a training dataset) which includes video segments of events and replays. In training or generating the model, the model is provided with the training data and attempts to correctly associate events with replays.

In some embodiments, training or generating a model typically includes iteratively modifying the configuration of the model (e.g., weights, connections, biases and activation functions) according to how well (or whether or not) the model succeeds to correctly associate events with their replays. Accordingly, a model that can automatically and correctly associate events with their replays may be generated. In some embodiments, a model may be trained to associate probability values with an association of events and replays, e.g., with respect to a specific event/replay pair, a model may be trained to select a relatively high probability value if it determines that the replay is highly likely to be of the event.

In some embodiments, a stage or step of matching (or associating) an event with a replay using metadata as described may include a plurality of sub-stages including, e.g., a first sub-stage for assigning an event a likelihood value that indicates how likely the event is to have a replay as described. For example, an embodiment may "know" that an event in which two players are talking is unlikely to have a replay (and may therefore assign the event with a likelihood to have a repay of "0") while a whistled foul play is an event which is sure (or is highly likely) to have a replay (and may therefore assign the event with a value of "1" as the likelihood of having a replay).

A subsequent sub-stage may associate (e.g., link or connect) event and replay pairs with matching likelihood (or probability) values. As described herein, having identified high-interest events, that is, events that are expected to have replays, an embodiment may attempt to find and associate replays with the identified events. For example, an embodiment may associate or calculate a probability value of "0.4"

for a match between an event and a first replay and a probability value of "0.93" for a match between the event and a second, different replay. An embodiment may select to associate, with an event, the replay for which a matching probability value is the highest.

As described, in order to identify events which are likely to have a replay and in order to associate a specific event with specific one or more replays, metadata of segments and frames may be used. For example, a machine learning model may be trained to identify, in a video, events that are likely to have replays as well as to associate (e.g., link or identify a connection between) events with replays based on metadata such as when did an event and a replay happen (e.g., with respect to a game clock or a relative or absolute time or frame in a video), how long an event/replay is and/or based on other features in, or aspects of a video, etc.

In some embodiments, a machine learning model as referred to herein may be, or may include any decision algorithm unit, or it may implement any other logic, e.g., boosted algorithms such as XGBoost, a Neural Network (NN), a deep neural network (DNN), a Random Forest and k-nearest neighbors algorithms and the like. A machine learning model as referred to herein may be, or may include, a collection of nodes and a model describing logic performed by nodes, relations or connections (e.g., associated with weights) between nodes. For example, training a machine learning model may be accomplished using various machine-learning techniques and/or may produce a model usable for carrying tasks such as associating events in a video with their replays.

For example, a machine learning model (or simply model) may be used to associate, with respect to a specific (e.g., pre-selected or predefined) event captured in a video, each of a plurality of replays with a probability value that reflects the likelihood that the replay is of (captures or shows) the specific event. It is noted that combinations of multiple stages may include: identifying events that are likely to have a replay (first stage) and matching identified events with replays (second stage), which have been found, in experiments conducted with embodiments of the invention, to greatly improve the accuracy of automated association of events with replays, that is, an embodiment including the combination of the two stages produced highly accurate matching results as well as identify events for which no replays exist. Accordingly, identifying a set of events that are highly likely to have a replay and then associating events in the set with replays as done by some embodiments of the invention improves and increases the accuracy of association of events with replays. Matching a specific event with a specific replay based on, e.g., metadata may include calculating, e.g., by controller 105, a correspondence measure or value in the form of a probability value ranging from "0" to "1" where "0" means the specific event is unrelated to the specific replay and "1" means the specific replay is indeed a replay of the specific event.

Identifying events that are likely to have a replay and then matching them with replays as described may be used in order to process video in real-time (e.g., live streaming). However, other embodiments, configurations or operation modes are contemplated. For example, when operating, e.g., in real-time mode, the video, events or replay may enter the system/controller asynchronously. Therefore, some embodiments in order to not cause a latency may, given a replay (e.g., in the form of a metadata object 133 including reference to segments and description of a replay as described), examine a set of events that occurred before the replay, calculate a set of link likelihoods or association probability values, each denoted herein as Pa, (e.g., a set of Pa's as further described herein) for the given replay and some (or each of) the events in the set, and select to associate with the given replay, one of the events. For example, if a Pa for the given replay and a specific event is within a predefined range (e.g., above a threshold) then an embodiment may select to associate the given replay with the specific event. In other embodiments, a set of Pa's may be calculated for a replay and a set of events and an embodiment may associate the replay with the event which has the highest Pa.

A yet another step in a cascade process (e.g., a cascade process including a first process of calculating Pr's for a set of events, and a second process including calculating Pa's for event/replay pairs) may calculate, determine, estimate and/or quantify visual correspondence between a specific replay and a specific event. Specifically, the visual correspondence may be determined using a model generated using machine learning.

Generally, quantifying a visual match or correspondence may include an embedding step and a matching step. For example, a neural network (NN) may be trained to embed events and replays in an embedding space and may be further trained to minimize the distance between two sequences of images (or frames) that capture the same event from two different angles (or points of view) and/or are present the event with different speed or pace (e.g., fast-motion or slow-motion). The NN may further be trained to maximize the distance between two sequences related to two different events. An embedding space may be automatically, internally and autonomously defined by an NN. For example, an NN may automatically and/or autonomously identify features in frames of a video and automatically, autonomously or internally define an embedding space based on the automatically and/or autonomously identified features.

An embedded space used by some embodiments of the invention may solve the problem of non-exact or incorrect matching (or association) of events and replays. For example, known systems and method typically fail to correctly or automatically associate an event with its replay since the event and replay may be captured by different cameras, from different angles or viewpoints and may be shown in a video at different speeds. An embedding space may be resistant to, or unbiased by aspects such as speed or point of view. For example, an embedding space defined by features such as presence of a player in a court, color, light intensity, number of players shown, and presence or absence of an object (e.g., a ball or a basket), which may be unaffected by aspects such as point of view or playback speed, accordingly, using an embedding space, embodiments of the invention improve the field of video processing, e.g., by accurately associating events with replays, including in cases where current or known systems and methods fail to do so.

For example, an embedding step may include generating, for a frame or sequence of frames, a feature vector in an embedding space. A matching step may then determine distances between vectors in the embedding space and match events with replays based on the distances.

Generally, an embedding space and features vectors as described herein may be of any dimension, that is, defined by any set of features. For example, each of: a color, light intensity, number of players shown, a position of a player, presence or absence of an object (e.g., a ball or a basket) and so on may be treated as a feature and may be represented (e.g., by an axis) in an embedding space, and may be used for generating a feature vector for an image.

In some embodiments, features are defined and used internally, by an NN or model. For example, an NN may automatically learn or identify that presence of a player in a court, a posture of a player, direction or speed of a flight of a ball and the like are features that, when used to define an embedding space improve performance, and the NN may automatically use the identified features.

Accordingly, an NN may be trained to define an embedding space, represent frames by feature vectors in the embedding space, associate events with their replays based on distances between vectors. Distances between vectors as referred to herein may be checked, measured or determined, e.g., using vector calculus, vector analysis and/or multivariable calculus.

An NN may trained, using either supervised or unsupervised training, on a large dataset such that a model is generated wherein the model be used to create an embedding space where, when embedded as described, two shots of the same event, taken from two different angles, are close to each other in the embedding space (their respective vectors are close to each other) and the two shots are also distant from shots of other events.

In some embodiments, processes, operations or steps of identifying events that are likely to have a replay and matching calculating a probability value for a match between events and replays (e.g., based on metadata as described) may be performed before an NN model applies the vectors technique described herein. For example, the metadata step may be used to filter out events that are highly unlikely to have replays (or be linked or associated with a replay) so that the embedding space may have less events to process. In some embodiment, a decision on a match between, or an association of, an event and a replay may be based on the combined results of one, two, or even all of the steps described, e.g., a decision or determination that a specific event is replayed in a specific replay may be done based on one, some, or all of: a probability value that the event has a replay (e.g., based on metadata as described), a match, measure or probability value indicating the likelihood that a specific replay is related to the event (e.g., based on metadata as described), and a distance, in an embedding space, of a vector representing the event and a vector representing a replay (referred to herein as a visual correspondence determination step or process).

Figure 2C:
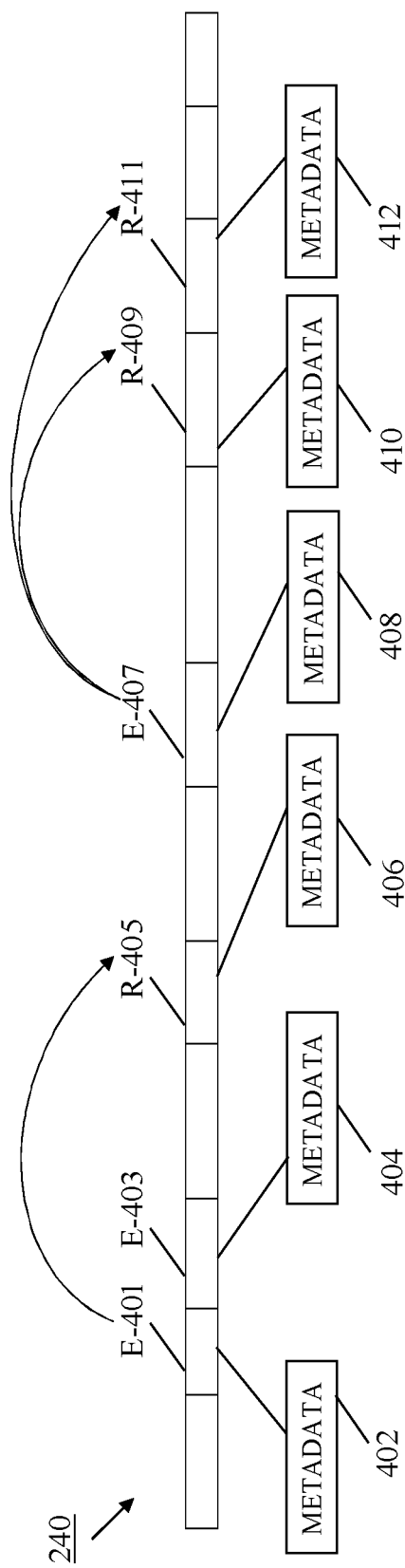
FIG. 2C schematically illustrates events and replays in a video according to illustrative embodiments of the present invention.

Reference is additionally made to FIG. 2C which schematically illustrates events and replays in a video according to illustrative embodiments of the present invention. FIG. 2C is presented mainly for explanatory purposes. As shown, an input video 240 (e.g., retrieved from videos 131 or received as live stream 134) may include a plurality of events E-401, E-403 and E-407 and a plurality of replays R-405, R-409 and R-411, and, as further shown, each of the events and replays may have one of metadata objects 402, 404, 406, 408, 410, or 412 associated with it. For example, an association of metadata object 402 with event E-401 may be by including in metadata object 402 a reference to event E-401, e.g., in the form of start and end frames or times, offset from a reference point in input video 240 (and/or length). Any system or method that links events and replays with their metadata objects such that it enables finding and retrieving a metadata object given an event and vice versa may be used by embodiments of the invention.

As illustrated by the arrows extending from events E-401 and E-407, R-405 is a replay of E-401 and R-409 and R-411 are two (possibly different) replays of E-407. As described, provided with video 240 as input, an embodiment (e.g., controller 105) may identify the associations illustrated by the arrows in FIG. 2C, e.g., controller 105 may identify, discover and/or determine that R-405 is a replay of event E-401 and that replays R-409 and R-411 are two replays of events E-407. Controller 105 may further inform, provide, and/or store identified associations of replays and events, e.g., present associations on a screen, store a list of associations in storage system 130. Accordingly, an output of an embodiment may be information describing association of, or linkage between, events and replays in a video, such information may be of great value, e.g., in creating a synopsis or highlights for a sporting event, synchronizing videos from a crime scene and the like. For the sake of simplicity and clarity, event E-401, event E-403 and event E-407 may be referred to herein as simply E-401, E-403 and E-407 respectively, similarly, replay R-405, replay R-409 and replay R-411 may be referred to herein as R-405, R-409 and R-411.

In some embodiments, associating a replay with an event in an input video content may include: identifying an event captured in the input video content and at least one replay included in the input video. Various systems and/or methods of image or video processing may be used in order to identify events and replays in an input video 240. In some embodiments, controller 105 may receive input video 240 with accompanying information, e.g., metadata objects 402-412 may be provided to controller 105 thus (based on information in metadata objects) locations in video 240, lengths, start and end times or any other attributes or relevant information of events E-401, E-403 and E-407 and replays R-405, R-409 and R-411 may be known controller 105 when processing input video 240.

Some embodiments may calculate, for an event, and may assign to the event, a replay probability value (denoted Pr). A Pr of (calculated for or a associated with) an event may generally indicate, quantify or reflect the likelihood (or probability) that at least one replay of the event is included in an input video content, that is, the likelihood that this event has a replay. For example, based on information in metadata object 402 controller 105 may calculate a Pr that reflects the probability that there exists a replay for event E-401. Controller 105 may then associate the Pr with E-401. Associating the Pr with E-401 may be achieved by storing the Pr in metadata object 402, any information or values may be associated with events or replays by storing the information or values in their respective metadata objects.

In some embodiments, if controller 105 determines that an event is highly likely to have a replay (e.g., the event is of importance with respect to a game) then controller 105 may associate the event with a relatively high, (e.g., within a range or above threshold, probability value (Pr) of having a replay (e.g., the relevant Pr may be set to 0.87 which is relatively high with respect to a 0-1 range). Conversely, if controller 105 determines an event is unlikely to have a replay (e.g., it's of little or no interest) then controller 105 may associate the event with a relatively lower or below a threshold probability value (Pr) (e.g., the relevant Pr may be set to 0.23 which is relatively low in a 0-1 range). Controller 105 may use a wide range of Pr's (e.g., a range from "0" to "1" in steps of "0.01") such that a range of interest levels may be represented by Pr's.

For example, in tennis, the probability of a double fault event having a replay is relatively very low. Accordingly, if controller 105 identifies (based on information in a metadata object 133) that an event is a double fault, then controller 105 may associate a relatively low Pr with the event.

Similarly, if controller 105 identifies another event as a touchdown, it may associate the event with a relatively high Pr.

Some embodiments may calculate an association probability value (denoted Pa) for an event and a replay. For example, with respect to E-401, controller 105 may calculate for some, or even each of replays R-405, R-409 and R-411, a Pa which reflects the probability or likelihood that the replay is of E-401. Controller 105 may assign a Pa to each event/replay pair. For example, controller 105 may calculate and assign a Pa to each of the event/replay pairs E-401/R-405, E-401/R-409 and E-401/R-411.

In some embodiments, a matching function or process may be used to determine whether or not a specific event is to be associated with a specific replay. A matching function as understood herein may relate to an algorithm, logic or process carried out by, for example, controller 105. For example, the matching function may receive, as input, a Pr of an event and a set of Pa of a respective set of replays and produce, as output, an indication of one or more of the replays as being of, or related to, the event, or the output of the matching function may be an indication that none of the replays is related to the event.

In various embodiments, the matching function may be as complicated or sophisticated as required and may use any information, e.g., any information included in metadata objects as described herein may be used by a matching function. Matching as described may include, or be based on Pr's and Pa's. For example, and to illustrate, given a replay, a matching function may calculate a set of Pa's for the replay with respect to a (respective) set of events, and may then multiply each of the Pa's by the Pr of the relevant or corresponding event. The event for which the product of its Pr and Pa is highest may be selected as the event that is associated with the replay. In another example, an embodiment may associate a replay with an event if the product of multiplying the relevant Pr and Pa is higher then a threshold (or is within a predefined range). It will be understood that the over-simplified multiplication example above is introduced for explanatory purposes and that any other calculations based on information in metadata objects may be included in some embodiments of the invention.

For example, assuming that the Pr's calculated for E-401, E-403 and E-407 are 0.64, 0.09 and 0.93 and the Pa's for R-405, R-409 and R-411 (when calculated with respect to E-401) are 0.87, 0.32 and 0.21 respectively, multiplying the Pr by each of the three Pa's produces the set of 0.556, 0.204 and 0.134 values. Assuming that a threshold of, e.g., 0.5 is used by controller 105, in this case controller 105 may determine that replay R-405 is actually a replay of event E-401 and that the other two replays are not of event E-401. In some embodiments, if two or more Pa's are above, or they breach a threshold, the embodiments may select the replay which is associated with the highest Pa or associate a replay and an event using heuristic, e.g., choosing the earliest or latest replay (with respect to the game clock) out of the replays with a Pa above the threshold.

Accordingly, in the above example, controller 105 may associate replay R-405 with event E-401, e.g., by updating a list in a database, inserting information into metadata objects of E-401 and/or R-405, extracting, from video 240, the segments including E-401 and R-405 and storing a video clip that includes the extracted segments and so on. As illustrated in FIG. 2C, there is no replay of E-403, for example, based on information in metadata object 404, controller 105 may assign E-403 with a Pr of 0.09 as in the above example, accordingly, a product of multiplying the Pr of E-403 by the highest possible value of a Pa (which may be "1") produces a value that is, remaining with the above example, less than the threshold of 0.5, therefore controller 105 may not associate E-403 with any replay in video 240.

Some embodiments may calculate, with respect to a specific replay, a set of Pa's including a Pa for each of a plurality of events, and may associate the specific replay with the event having the highest Pa in the set, that is, with the event for which (or that is associated with the) highest Pa in the set. For example, referring to the above example, the set of Pa's calculated for R-405, may include 0.556 for E-401 as described, 0.43 for E-403 and 0.19 for E-407, accordingly, since 0.556 is the highest Pa in the set, controller 105 may associate E-401 with R-405.

Some embodiments may calculate, with respect to a specific event, a set of Pa's including a Pa for each of a plurality of replays and may associate the specific event with the replay having the highest Pa in the set, that is, with the replay for which the highest Pa in the set was calculated. For example, referring to the above example, the set of Pa's calculated by controller 105 for E-401, that is, a Pa for each of R-405, R-409 and R-411 with respect to E-401 may be 0.556, 0.204 and 0.134, accordingly, controller 105 may associate E-401 with R-405.

In some embodiments the matching function may be based on, received as input, or otherwise take into account, a time interval between an event and a replay. For example, in addition to other considerations as described, a Pa may be calculated, determined and/or set according to a distance (in time or in frames) between an event and a replay. For example, a Pa for an event-replay pair (e.g., the Pa calculated for R-409 with respect to E-401, denoted as the Pa of the pair of E-401/R-409) may be increased or raised by some factor or quantity if the replay occurs within a specific time interval (or distance) from the event. For example, part of the reason that, in the above example, the Pa calculated for the pair of E-401/R-411 is relatively low (0.21) may be due to the fact that R-411 occurs or appears in video 240 at a time (or distance, e.g., in frame count) that is relatively large or that is greater than a time threshold.

An embodiment may set a Pa according to various time or order considerations that may be related to the type, nature, scene or other aspects of content in an input video. For example, if it is known that replays of basketball broadcasts are typically shown within approximately ten second after an interesting event but replays of golf are typically shown minutes after an event then, when processing a basketball video controller 105 may increase the value of a Pa of a replay that occurs somewhere between eight and twelve second after an event while, when processing a golf video, controller 105 may increase Pa's of replays appearing somewhere between two to four minutes after an event and decrease Pa's of replays appearing in the video outside the two to four minutes time window.

In some embodiments the matching function may be based on, receive as input and/or otherwise take into account, the number of events between a replay and an event. For example, controller 105 may decrease a Pa calculated for a replay with respect to an event if one or more events are present, in an input video, between the replay and the event thus taking into account the fact that a replay typically appears close to an event and not after a sequence of events took place.

In some embodiments the matching function may be based on, receive as input and/or otherwise take into account, the number of replays between the replay and the event. For example, controller 105 may increase the Pa for the first replay that appears after an event, slightly decrease the Pa of the next (second) replay after the event and so on thus taking into account the fact that the first replay after an event is more likely to be the event's replay. It will be understood that the examples of rules and logic for calculating a Pa involving time intervals, time windows and order of events and replays as described herein are over simplified and are introduced for explanatory purposes and that a matching function as described herein may include highly complicated and/or complex rules and logic applied to time and order of events and replays.

In some embodiments the matching function may be based on, receive as input and/or otherwise take into account, any information in a metadata object of an event or in a metadata object of a replay. In some embodiments calculating a Pr for an event (that is, a Pr reflecting, indicating or quantifying the likelihood that the event has a replay) may be based on, receive as input and/or otherwise take into account, any information in a metadata object of an event and/or in a metadata object of a replay. In some embodiments calculating a Pa for an event/replay pair (that is, a Pa reflecting, indicating or quantifying the likelihood a specific event is associated with a specific replay) may be based on, receive as input and/or otherwise take into account, any information in a metadata object of an event and/or in a metadata object of a replay.

For example, metadata objects 133 (e.g., 204, 210 or 238) may include a duration value indicating how long (e.g., in seconds) an event or replay is, a rating of the event (e.g., a score indicating or quantifying the combination of how common, significant and extraordinary the event is), a game clock time (e.g., as shown in a stadium), the quarter (e.g., in a basketball game). Metadata objects 133 may include a description of an event or replay, e.g., "home score", "visitor score", "is it a touchdown event?" (e.g., in a football game), "is it a homerun event?" (e.g., in a baseball game), "is it a winner event?" (e.g., in a tennis game) and the like. Any other information may be included in metadata objects 133, e.g., score difference, tournament or league information and the like. Metadata objects 133 may include time related information, e.g., time between a replay and an event, e.g., time between a replay and the last event in a game, time between a replay the event prior to the last event and so on. Metadata objects 133 may include time between an event and a replay, e.g., time between the event and the next (first after the event) replay, or between the event and the second or third replay and so on. Other information in metadata objects may be, for example, total number of replays in a game (or up to a point in a video or stream), number of replays shown in a sequence after an event and so on.

For example, in football, after an extra point attempt there is typically a replay of the touchdown that happened before the extra point, that is, although the extra point and an immediate replay are adjacent, the probability of the immediate replay to be of (and thus associated by an embodiment with) the extra point event may be relatively low. Using information in metadata objects 133 as described, embodiments of the invention may identify that an event is related to an extra point, identify a set of replays following the event and correctly associate the extra point event with the relevant replay (that may be, for example, the third or fourth replay after the event and not the immediately following the event).

In some embodiments, controller 105 (or a set of controllers 105) may generate, for a set of events captured in an input video, a respective set of event feature vectors in an embedding space; generate a set of replay feature vectors, in the same embedding space, for a respective set of replays, and controller 105 (or a set of controllers 105) may associate at least one of the replays with an event based on the distances of the relevant event feature vector from at least some of the replay feature vectors.

Figure 3:
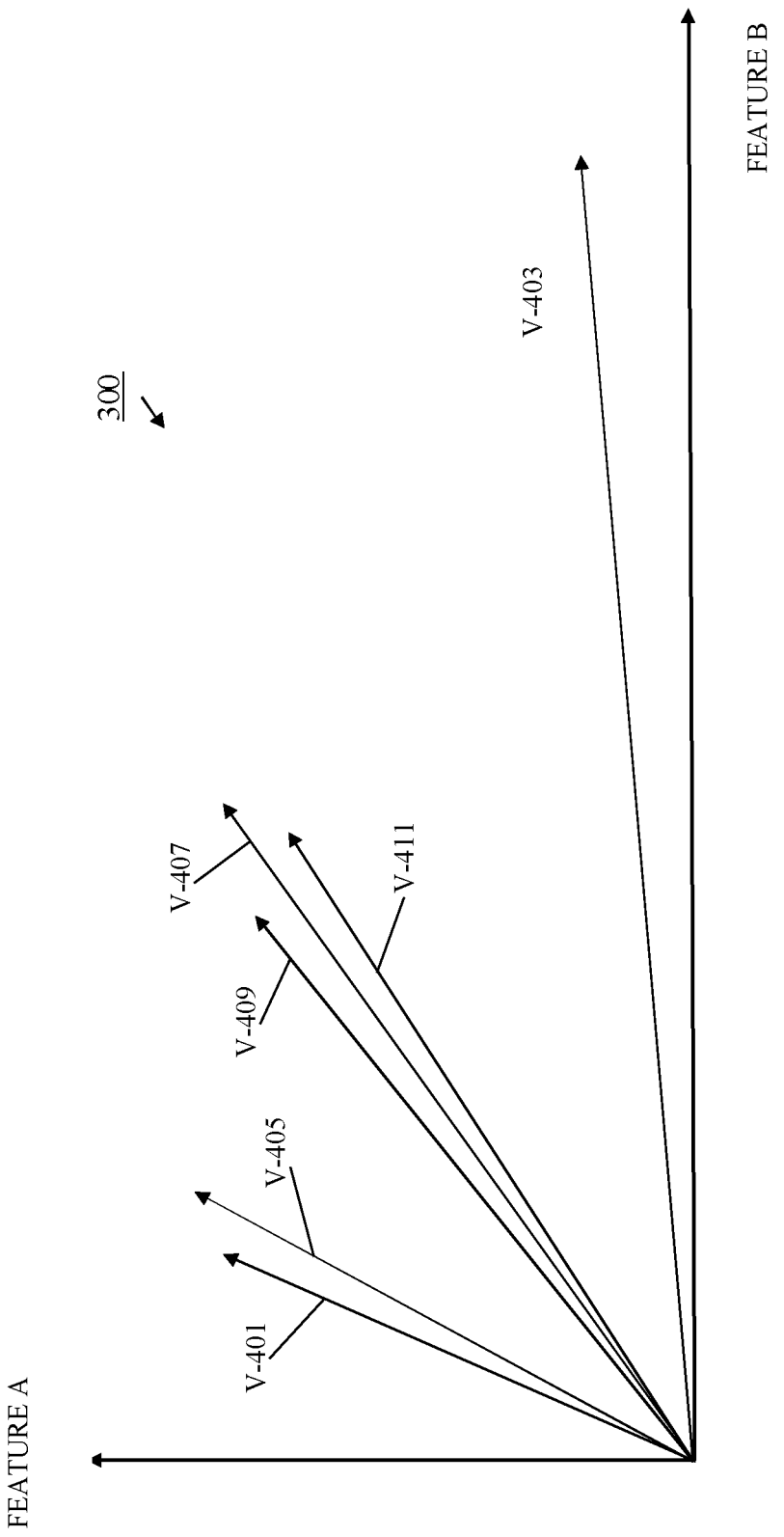
FIG. 3 schematically illustrates feature vectors in an embedding space according to illustrative embodiments of the present invention.

Reference is made to FIG. 3 which schematically illustrates feature vectors in an embedding space 300 according to illustrative embodiments of the present invention. Embedding space 300 is visualized as an oversimplified space, omitting details and data points, for the purpose of clarity. As shown, embedding space is defined by two feature coordinates which may be selected, for example, from features such as lighting, position of a player, number of players in a frame, presence or absence of an object (e.g., a ball) and so on. It will be understood that embedding spaces used by embodiments of the invention may have, or be of, a large number of features (not just two as shown by space 300), for example, 512 different features may be used to define a 512 dimension embedding space.

As shown, feature vectors V-401, V-403 and V-407 may be created, calculated or defined for E-401, E-403 and E-407 respectively and the features may be placed in space 300. As further shown, feature vectors V-405, V-409 and V-411 respectively for R-405, R-409 and R-411 may be placed in space 300. It will be understood that placement of vectors in an embedding space as described may be, or may include, determining a size and orientation of the vectors in the space, e.g., placement of vectors in an embedding space as described may include recording any information that enables calculating distances between vectors.

As illustrated, vector V-405 is relatively close to vector V-401 and relatively distant from vectors of other events, accordingly, with reference to the example in FIG. 3, controller 105 may associate R-405 with E-401, similarly, since vectors V-409 and V-411 are close to vector V-407, controller 105 may associate R-409 and R-411 with E-407. As further illustrated, V-403 is far or distant from all other vectors in space 300, e.g., while E-401 and E-407 are events involving a dunk in a basketball game, E-403 may be an event in which two players argued and pushed each other.

In some embodiments, a method of associating first and second images (or frames in a video) may include obtaining a set of images or frames, the set including the first and second images or frames; generating, for each of the set of images or frames, a feature vector in an embedding space; calculating a first distance, the first distance indicating the distance, in the embedding space, between the feature vector of the first image and the feature vector of the second image; calculating a set of distances, the set of distances indicating the distances, in the embedding space, between the feature vector of the first image or frame and the feature vectors of the set of images or frames; and if the first distance is smaller than each of the set of distances then associating the first image or frame with the second image or frame. It will be noted that embodiments of the invention may associate an image with one or more images in a set of images and/or associate a frame in a first video with one or more frames in the first video or in with one or more frames in a second, different video.

For example, referring again to FIG. 2B, a feature vector may be generated for frame 221 and for each of frames 231-237 and controller 105 may measure, check or determine the distance between the feature vector of frame 221 from each of the feature vectors of 231-237 and may further associate frame 221 with one of frames 231-237 based on the measured distances, e.g., controller 105 may associate frame 221 with the frame who's feature vector is closest to the feature vector of frame 221. For example, frame 221 may be associated with frame 231 since the distance between the vector of 221 and that of frame 231 may be shorter than the distance of the vector of 221 from the vectors of frames 232-237.

It will be understood that vector distance as described herein may be used in conjunction with other methods described herein. For example, rather than associating events and replays based on vector distance as described, controller 105 may increase or decrease a Pa according to a distance between vectors, accordingly, a Pa may be the result (or may reflect) aspects related to metadata as described and aspects related to visual correspondence as described. Accordingly, an association of frames (or sequences of frames) or an association of events with replays may be according to a cascade process, sequence or set of steps of: calculating Pr's for events, calculating Pa's for event-replay pairs (e.g., using metadata as described), and calculating (e.g., using vectors as described) a visual correspondence (or match) for event-replay pairs.

In some embodiments, a method of associating first and second sequences of frames (e.g., first and second segments of a video where each segments includes a (possibly large) number of frames) may include generating, for each of at least some of the frames, a feature vector in an embedding space; for each of at least some of the frames in the first sequence: calculating a set of distances between a feature vector of the frame and a respective set of feature vectors of frames in the second sequence; and associating the frame with a frame in the second sequence based on the shortest distance in the set of distances. For example, the process of associating frame 221 with one of frames 231-237 may be repeated for frames 222 and 223 in FIG. 2B and the sequence of frames 221-231 may be associated with the sequence of frames 231-233. For example, an embodiment may identify that frame sequence 231-233 is a replay of frame sequence 221-231 by associating frame 221 with frame 231, frame 222 with frame 232 and so on. Since an event and its replay may typically be included in, or captured by, sequences of frames in a video, associating frame sequences as described may be, or may result in, association of events with replays. It will be noted that in some embodiments, cases or scenarios, sequences of frames (e.g., events and replays) associated as described may be in the same video (e.g., the frame sequence of 201-205 in video 200 may be associated with the frame sequence 207-211 in video 200) while in other embodiments, cases or scenarios, a set of frames in a first video may be associated with a second frame in a second, different video, e.g., frame sequence 221-231 in a first video (220) may be associated with frame sequence 234-237 in a second, different video (230).

In some embodiments, a method of associating sequences of frames (or event and replays) may be based on identifying an ordered set of frames in a first sequence is associated with a respective ordered set of frames in a second sequence. For example, if controller 105 determines that frames 221-223 are respectively associated frames 231-233 then controller 105 may determine that an ordered set of frames in a first sequence is associated with a respective ordered set of frames in a second sequence. However, if controller 105 determines that frame 221 is associated with frame 232, frame 222 is associated with frame 231 and frame 223 is associated with frame 223 then controller 105 may, realizing that the order of frames in video 220 is different from the order of associated frames in video 230, determine that the sequences 221-223 and 231-233 are not associated. It is noted that an order may not necessarily mean the exact same order or that frames are to be sequential or consecutive in a video, for example, the frame sequence 221-223 may be associated with the frame sequence of 231, 233 and 235, that is, although frames 231, 233 and 235 are not back-to-back as are frames 221-223, on order may still be identified by controller 105, that is, controller 105 may identify a common progress in time for a first and second frame sequences.

In some embodiments, a frame in a first set or sequence of frames may be associated with a set of frames in the second sequence. For example, controller 105 may identify (or learn from metadata as described) that a sequence of frames is a slow-motion representation of an event and may consequently, for example, allow some deviation from an expected order, e.g., if the frame sequence 231-237 is a slow motion replay of an event captured by frames 231-223, controller 105 may associated more than one of frames 231-237 with each of frames 231-233.

In some embodiments, an event (first sequence of frames) may be captured from a first point of view (e.g., by a first camera in a stadium) and a replay of the event (second sequence of frames) may be captured from a second, different point of view (e.g., by a second, different camera in the same stadium). Matching (and associating) events with replays by looking at their respective metadata information as described and by further matching and associating events and replays based on visual correspondence (e.g., using vectors as described) embodiments of the invention may succeed in automatically associating an event with its replay even if/when different points of view are used for capturing the event and the replay.

Advantages of automatically associating events with their replays may be readily appreciated. For example, an embodiment may provide association tables 132 to a user or an application thus enabling generating a video clip that includes an event and its replay. For example, using association table 132 an embodiment may quickly and efficiently extract an event and its replay from a video (e.g., in order to create a short, highlights video), in another example, using association table, an embodiment may enable a user to quickly and directly (e.g., by a click of a button or mouse) skip or jump from an event to its replay and so on.

In some embodiments, machine learning (ML) and/or neural networks (NN) may be used or included. For example, an embedding space may be defined by an NN unit that may be provided with events and replays and may be trained to define an embedding space suitable for projecting and analyzing vector distances as described.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Figure 4:
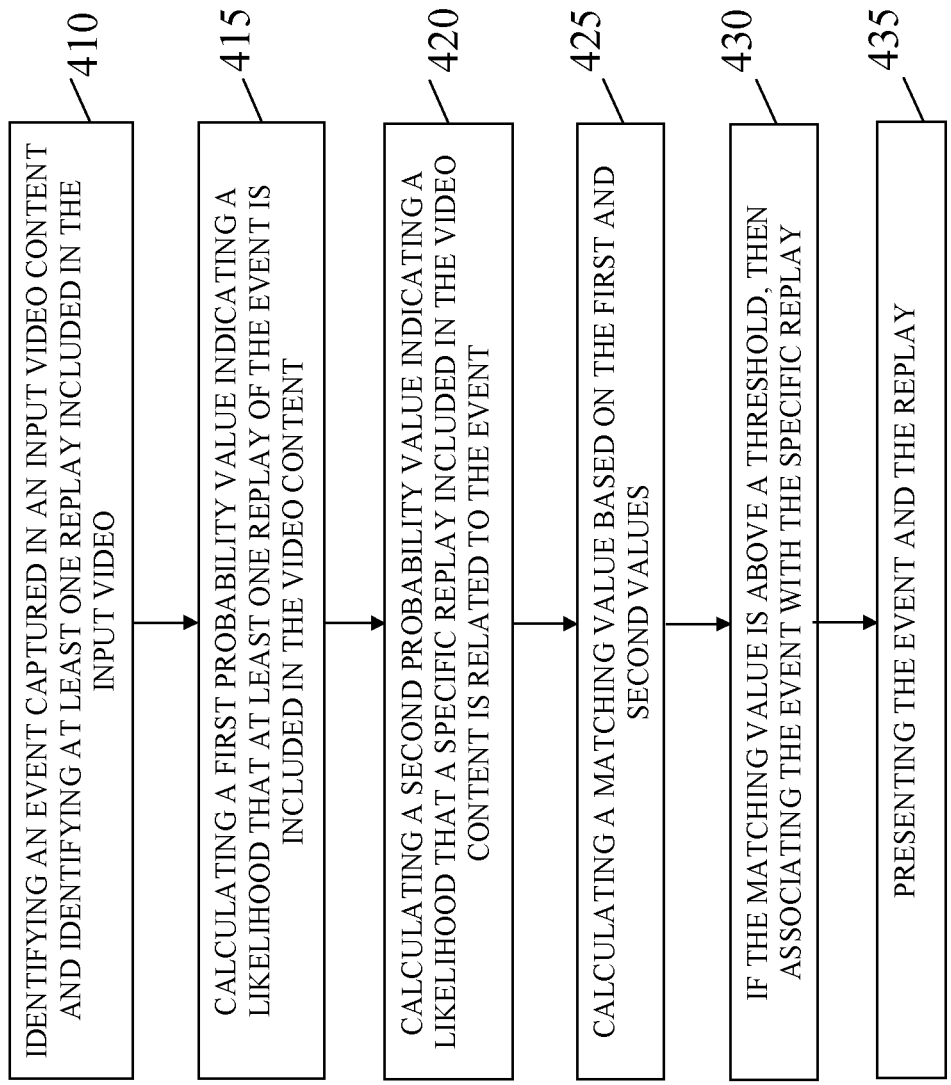
FIG. 4 shows a flowchart of a method according to illustrative embodiments of the present invention.

Reference is made to FIG. 4 which shows a flowchart of a method according to illustrative embodiments of the present invention. As shown by block 410, a method of automatically associating a replay with an event in an input video content may include identifying an event captured in the input video content and identifying at least one replay included in the input video. For example, an event may be identified based on determining a goal was scored and so on as described and replays may be identified by identifying slow-motion or fast-motion as described.

As shown by block 415, a first probability value indicating or quantifying the likelihood that at least one replay of the event is included in the video content. For example, a Pr may be calculated for an event as described. As shown by block 420, a second probability value indicating or quantifying the likelihood that a specific replay included in the video content is related to the event. For example, and as described, a Pa may be calculated for a specific event and a specific replay where the Pa indicates or quantifies the likelihood that the specific replay is a replay of the specific event.

As shown by block 425, a matching value may be calculated based on the first and second values. For example, a matching value for a specific (selected or chosen) event and a specific (selected or chosen) replay may be calculated by multiplying the Pr of the event by the Pa which was calculated for the event and the replay. As shown by block 430, if the matching value is within a predefined range, e.g., above) a threshold, then the event may be associated with the replay. For example, if a matching value calculated for event E-401 and replay R-405 is within a predefined range, e.g., above a threshold (e.g., greater than 0.5), then controller 105 may determine that replay R-405 is indeed a replay of event E-401 and may accordingly associate event E-401 with replay R-405 (e.g., by inserting an entry into an association table 132 as described). As shown by block 435, the event and replay may be presented. For example, an embodiment may generate and/or present a video clip in which an event and its replay are shown in sequence, e.g., the replay is shown immediately after the event even though in an original or input video or live video stream 134, the replay does not appear immediately after the event.

As described, some embodiments of the invention may associate events with replays, e.g., using two (or more) passes or processes, e.g., a first pass may include associating a set of events with a probability value (e.g., a Pr as described) that indicates how likely each event is to have (or merit) a replay. Using a threshold, some of the events may be selected to be processed in the next, or second pass or process. For example, a set of Pr's for a set of ten events may be a respective set of values in the range of zero to one (0-1) and, using a threshold of 0.72, a subset of the events may be selected to be further processed in the second process or pass, e.g., only events with a Pr greater than 0.72 are selected. A second pass or process may include calculating, for some of each of the selected set of events, a probability of being related to one or more of a set of replays.

Some embodiments of the invention improve the field of video processing, for example, by reducing the number of events that need to be processed. For example, by first identifying the events that are likely to have a replay and then checking for replays only for these identified events, some embodiments of the invention avoid trying to match each event in a video with a replay. Accordingly, speed of operation is improved, for example, by determining an event is unlikely to have a replay, comparing (or attempting to match) the event with each of a (possibly large number of) replays in a video in avoided and thus efficiency and speed are served. In another example, since values need to be stored while matching events with replays (e.g., association lists, probabilities and the like), by only processing some of the events in the second pass, some embodiments reduce the amount of information that needs to be stored thus further improving the field.

In the detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of associating a replay with an event in an input video, the method comprising:
  identifying, by a processor, an event captured in the input video and at least one replay included in the input video;
  assigning, by the processor, a first probability value to the event indicating a probability that at least one replay of the event is included in the input video;
  assigning, by the processor, a second probability value to each of a plurality of replay segments of the input video indicating a probability that the respective replay segment is related to the event;
  for each of the plurality of replay segments, calculating, by the processor, a matching value based on the first and second probability values; and
  associating, by the processor, the event with each of the plurality of replay segments for which the matching value is within a predefined threshold range.

2. The method of claim 1, comprising:
  calculating, by the processor, with respect to a specific replay, a matching value for each of a plurality of events; and
  associating, by the processor, the specific replay with the event having the highest matching value.

3. The method of claim 1, comprising:
  calculating, by the processor, with respect to a specific event, a matching value for each of a plurality of replays; and
  associating, by the processor, the specific event with the replay having the highest matching value.

4. The method of claim 1, wherein calculating a given matching value is based on a time interval between a given event and a given replay.

5. The method of claim 1, wherein calculating a given matching value is based on a number of events between a given replay and a given event.

6. The method of claim 1, wherein calculating a given matching value is based on a number of replays between a given replay and a given event.

7. The method of claim 1, wherein associating the event with a specific replay is based on metadata of at least one of: the event and the specific replay.

8. The method of claim 1, comprising:
  generating, by the processor, for a set of events captured in the video, a respective set of event feature vectors in an embedding space;
  generating by the processor, a set of replay feature vectors in the embedding space for a respective set of replays; and
  associating by the processor, at least one of the replays with an event based on the distances of the relevant event feature vector from at least some of the replay feature vectors.

9. The method of claim 1, comprising generating, by the processor, an output video including the event and at least one associated replay.

10. A method of associating replays with an event in an input video, the method comprising:
  in a first pass:
    assigning, by a processor, a set of first probability values to a respective set events in the input video, wherein a first probability value assigned to an event indicates the probability that at least one replay of the event is included in the input video;
    selecting, by the processor, some of the events by relating their respective assigned probability values to a threshold;
  in a second pass:
    for at least some of the events selected in the first pass:
      assigning, by the processor, to the event and with respect to at least some replay segments in the input video, a set of second probability values indicating a probability that a respective replay segment is related to the event;
      calculating, by the processor, a set of matching values based on the first probability value assigned to the event and the respective set of second probability values; and
      associating, by the processor, the event with each of the plurality values of replay segments for which the matching value is within a threshold range.

* * * * *